United States Patent
George

[11] Patent Number: 5,996,273
[45] Date of Patent: Dec. 7, 1999

[54] LURE TENDER

[76] Inventor: Allan E. George, 5020 Thornhill La., Columbus, Ohio 43017

[21] Appl. No.: 09/052,532

[22] Filed: Mar. 31, 1998

[51] Int. Cl.[6] .................................................. A01K 97/06
[52] U.S. Cl. ............................................. 43/57.1; 43/54.1
[58] Field of Search .................... 43/54.1, 57.1, 43/57.2; 206/315.11; 211/1, 86.01, 87.01, 120; 248/205.5, 206.3, 560; 224/920

[56]  References Cited

U.S. PATENT DOCUMENTS

| | | | |
|---|---|---|---|
| 258,393 | 5/1882 | Endicott | 43/57.2 |
| 294,888 | 3/1884 | Levison | 43/57.2 |
| 333,239 | 12/1885 | Levison | 43/57.2 |
| 335,506 | 2/1886 | Conroy | 43/57.2 |
| 337,593 | 3/1886 | Levison | 43/57.2 |
| 482,664 | 9/1892 | Weissenborn | 211/120 |
| 1,339,231 | 5/1920 | Stewart | 43/57.2 |
| 2,501,443 | 3/1950 | Fitzsimmons | 43/57.2 |
| 2,504,266 | 4/1950 | Knorr | 43/57.2 |
| 2,588,589 | 3/1952 | Tauber | 211/120 |
| 2,600,665 | 6/1952 | Lester | 43/57.2 |
| 2,624,973 | 1/1953 | Wilcox et al. | 43/57.2 |
| 2,659,997 | 11/1953 | Guestinger | 43/57.2 |
| 2,753,654 | 7/1956 | Bolls | 43/57.2 |
| 2,846,806 | 8/1958 | Gaines | 43/57.1 |
| 4,005,541 | 2/1977 | Henrichsen | 43/57.2 |
| 4,040,202 | 8/1977 | Wille | 43/57.2 |
| 4,068,760 | 1/1978 | Johnson, Jr. | 211/74 |
| 4,642,934 | 2/1987 | Carlson et al. | 43/55 |
| 4,691,471 | 9/1987 | Hansen | 43/57.2 |
| 5,070,806 | 12/1991 | Coster | 114/343 |
| 5,238,106 | 8/1993 | Nguyen et al. | 206/223 |
| 5,386,662 | 2/1995 | Vader et al. | 43/57.2 |
| 5,474,206 | 12/1995 | Herring, Sr. | 220/636 |
| 5,590,804 | 1/1997 | Crum et al. | 220/483 |
| 5,632,427 | 5/1997 | Gattuso et al. | 224/922 |
| 5,715,952 | 2/1998 | Chichetti | 224/922 |
| 5,791,471 | 8/1998 | Radmand | 206/366 |
| 5,815,979 | 10/1998 | George | 43/57.2 |
| 5,829,185 | 11/1998 | Myers | 43/57.1 |

*Primary Examiner*—Thomas Price
*Assistant Examiner*—Danen W. Ark
*Attorney, Agent, or Firm*—John L. Gray, Esq.; Kegler, Brown, Hill & Ritter, LPA

[57] ABSTRACT

A lure tender adapted to hold a plurality of lures thereon and also adapted to be releasably held on the surface of a fishing boat.

2 Claims, 3 Drawing Sheets

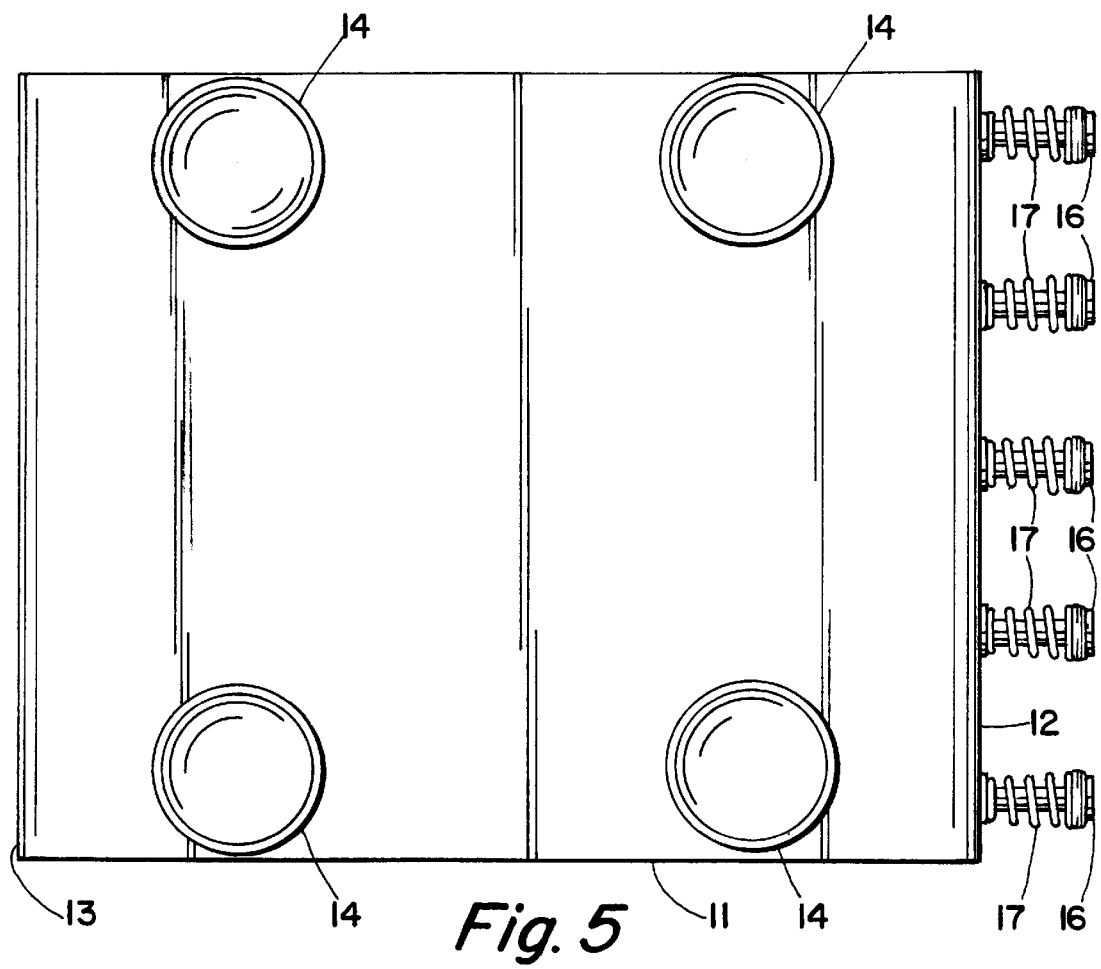
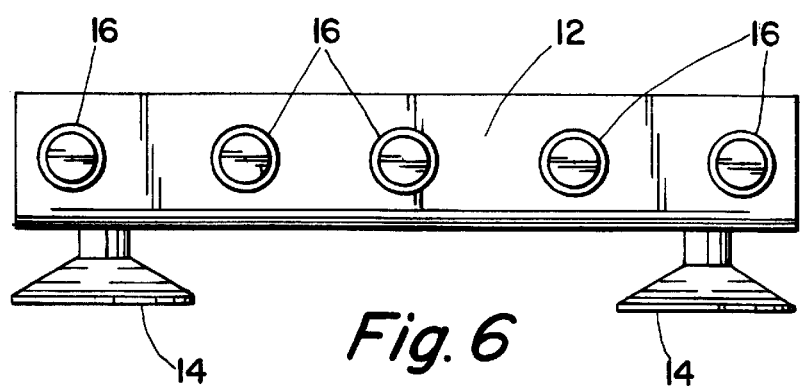

LURE TENDER

BACKGROUND OF THE INVENTION

There are many devices to hold fish hooks and to hold lures in place so that they do not become tangled up but none of them are designed so as to have the lures readily available for use while fishing in a boat.

BRIEF SUMMARY OF THE INVENTION

The invention of Applicant provides a device for holding a plurality of lures for a fisherman which may be readily attached to a portion of a fishing boat, which is usually made of fiberglass, so that the lures are readily available to the fisherman. The device may also be readily removed from the surface of a fishing boat without damage to the fishing boat.

It is therefore an object of this invention to provide a lure tender device which is readily accessible and easy to use. It is a further object of this invention to provide a lure tender device which may be readily attached to the surface of a fishing boat.

These, together with other objects of the invention, will become more readily apparent to those skilled in the art when the following statements and general descriptions have been read and in light of the appended drawings.

BRIEF DESCRIPTION OF THE DRAWINGS

FIG. 5. A plan view of the bottom of the lure tender showing the means for attachment to the surface of a fishing boat.

FIG. 6. A side elevation of the device shown in FIG. 5.

DETAILED DESCRIPTION OF THE INVENTION

Figure 1:
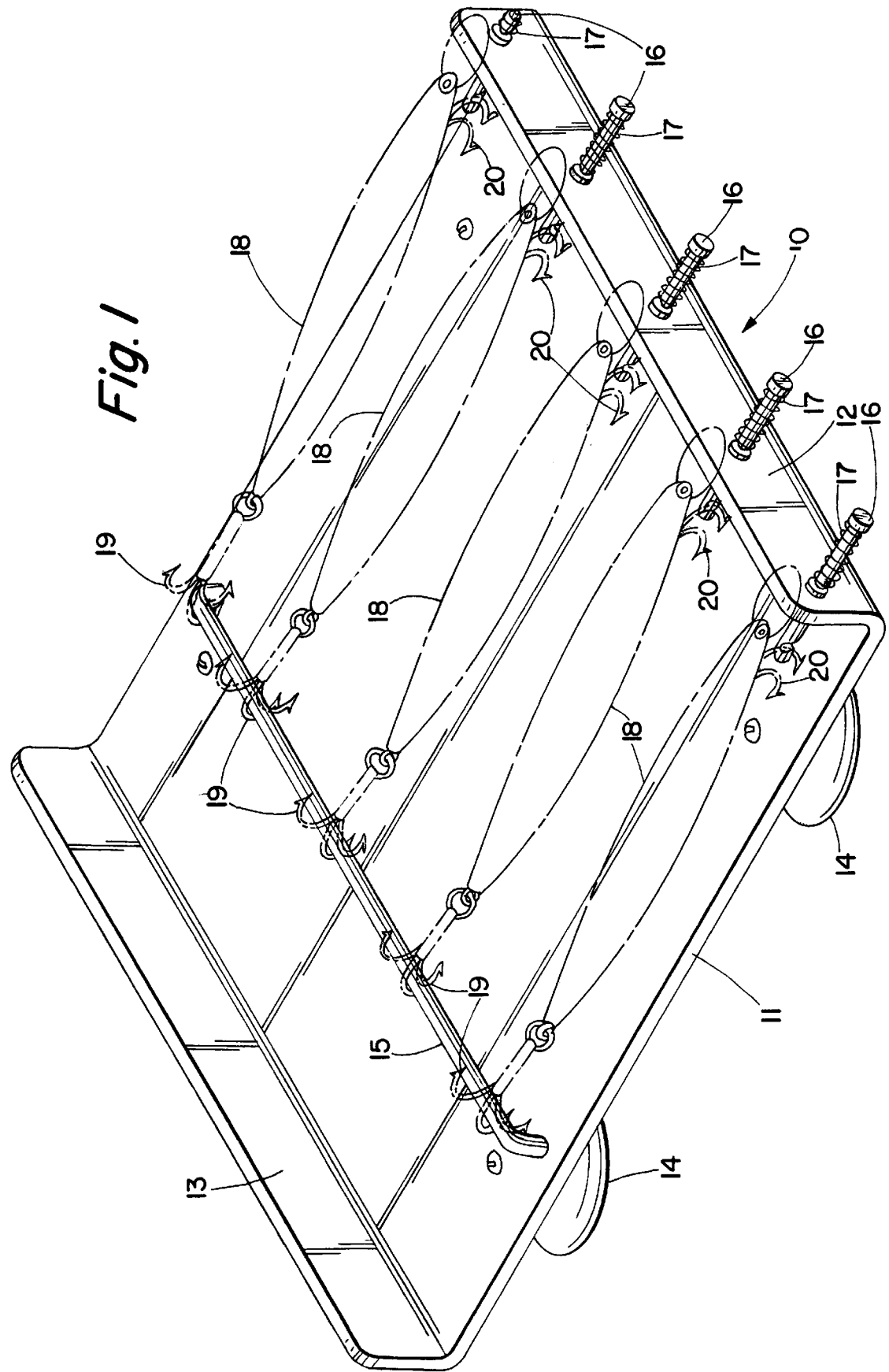
FIG. 1. A perspective view of the lure tender showing lures positioned thereon.

Referring now to FIG. 1, the lure tender is shown generally at 10 and is provided with a flat base member 11, an upstanding end 12, and if desired, an oppositely disposed end 13, also upstanding from the base member 11. Two of the suction cups 14—14 which are used to attach the lure tender to the surface of a fishing boat are also shown. A long rod 15 is attached at opposite ends of the base member 11 and is spaced from the base member and parallel thereto and also parallel to the upstanding end 12. It is of a diameter so as to readily engage hooks of the lures. The end 12 has a plurality of rods 16—16 held therein which are biased outwardly from said upstanding end 12 by means of springs 17—17. The lures 18—18 are provided at one end with hooks 19—19 which are adapted to engage the rod 15. At the opposite end, the lures 18—18 are provided with hooks 20—20 which are adapted to be held in slots in rod 16—16. This can be better seen from examining FIGS. 2, 3 and 4.

Figure 2:
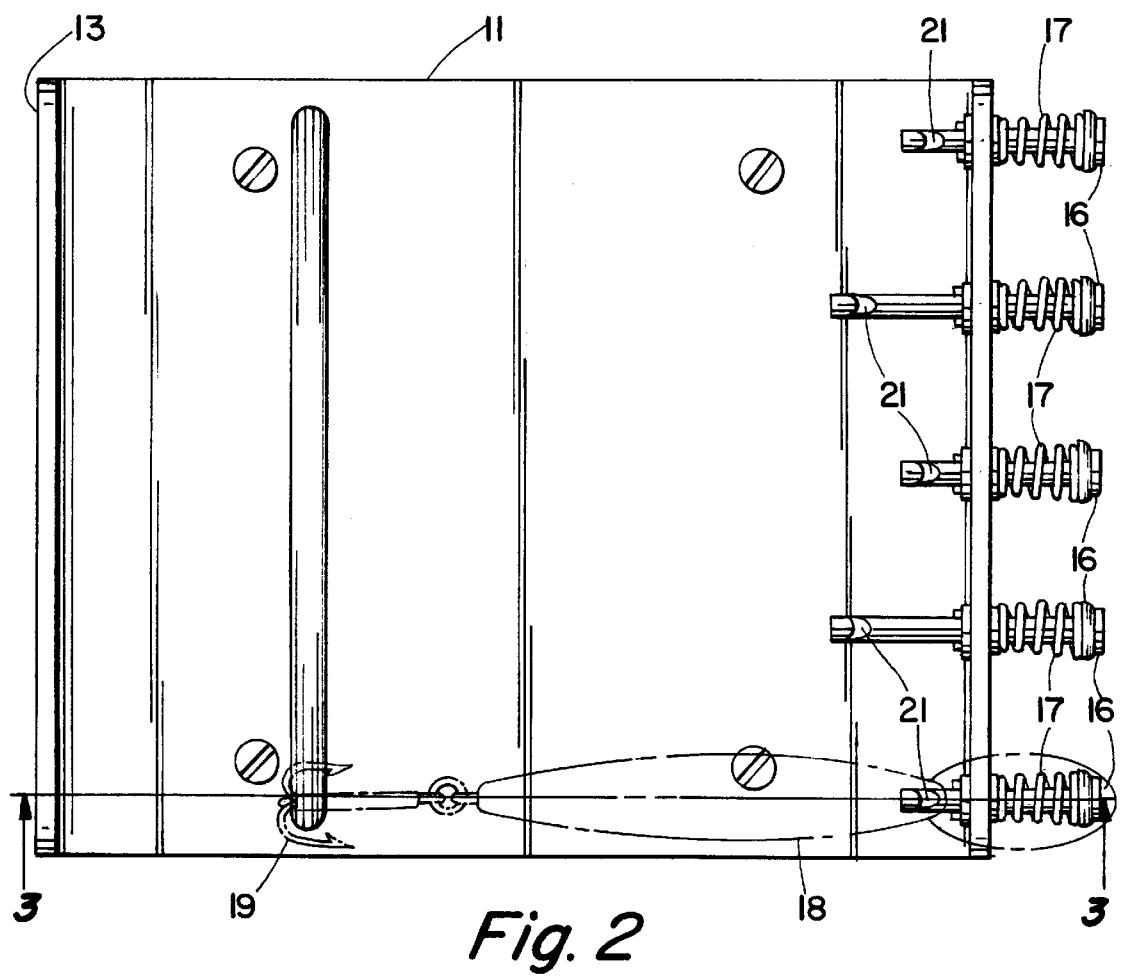
FIG. 2. A plan view of the lure tender with one lure positioned therein.
Figure 3:
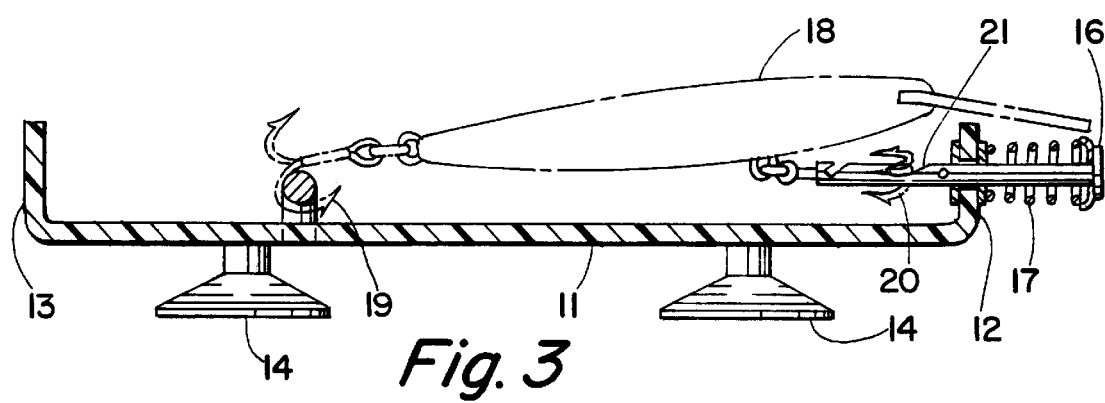
FIG. 3. A side elevation view in section 3—3 of FIG. 2.
Figure 4:
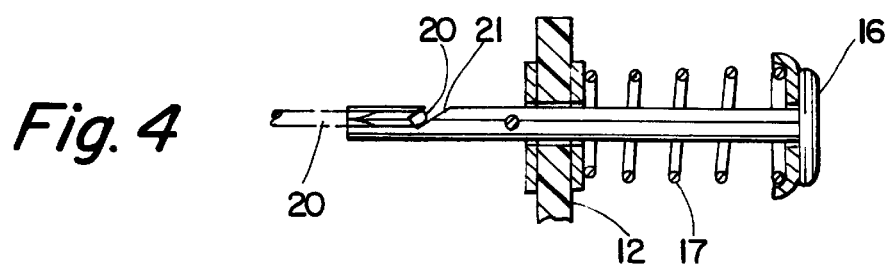
FIG. 4. A detail of a portion of FIG. 3, also in section.

Referring now to FIG. 2., it can be seen that the rods 16—16 are provided with slots 21—21 which are of a size to hold and retain hooks 20—20 as shown more clearly in FIG. 3. This is also shown in enlarged view of a portion of FIG. 3 which is shown in FIG. 4.

Referring now to FIG. 5 this is a view of the underside of the lure tender 10. It shows the base member 11 where the suction cups 14—14 are shown attached to the bottom of the base member 11. FIG. 6 is an end view of the device showing the rods and the suction cups.

In operation the lures have the hooks of one end hooked over the rod 15 and the hooks at the other end placed in the slots 21—21 of the rods 16—16. The entire unit then may be pressed down and releasably held to the surface of a fishing boat which is usually made of fiberglass.

While this invention has been shown and described with respect to a detailed embodiment thereof, it will be understood by those skilled in the art that various changes in form and detail thereof may be made without departing from the scope of the claims of the invention.

What is claimed is:

1. A lure tender comprising:

a base member having a flat portion provided with at least one end of said base member terminating in an upstanding end perpendicular to said base member, a long rod attached at its ends to said base member and having its major length spaced from and parallel to said base member and also parallel to and spaced from said upstanding end of said base member, said long rod being of a diameter so as to be able to have a fish hook attached thereover, said upstanding end of said base member, being provided with a plurality of short rods extending therethrough, each of said short rods being provided with a slot extending therethrough and of a size so as to be able to receive and retain a fish hook therein, each of said short rods being confined to limited movement by a spring, said base member being provided on the underside thereof with a plurality of suction cups, wherein each of the short rods is biased outwardly away from the upstanding end by the spring acting between the end of each short rod opposite the slot and the upstanding end.

2. The lure tender of claim 1 wherein an opposite end of said base member from the at least one end terminating in an upstanding end also terminates in an upstanding end perpendicular to said base member and parallel to the upstanding end provided with said short rods.

* * * * *